United States Patent
Yamazaki et al.

(10) Patent No.: US 7,054,649 B2
(45) Date of Patent: May 30, 2006

(54) MOBILE TERMINAL AND CONTROL METHOD THEREFOR

(75) Inventors: Masahiro Yamazaki, Yokohama (JP); Koji Suzuki, Yokohama (JP); Hideki Kuwamoto, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 296 days.

(21) Appl. No.: 10/630,911

(22) Filed: Jul. 31, 2003

(65) Prior Publication Data

US 2004/0097244 A1 May 20, 2004

(30) Foreign Application Priority Data

Jul. 31, 2002 (JP) .............................. 2002-223830

(51) Int. Cl.
*H04Q 7/20* (2006.01)
*H04Q 7/32* (2006.01)

(52) U.S. Cl. ............................... 455/456.3; 455/456.1; 455/412.1; 455/412.2; 455/418; 455/456.6; 455/550.1; 455/422.1

(58) Field of Classification Search ............ 455/456.1, 455/456.2, 456.3, 456.4, 456.5, 456.6, 457, 455/403, 422.1, 404.1, 404.2, 412.1, 412.2, 455/566, 550.1, 556.1, 557, 500, 517, 418, 455/419, 420, 414.1, 414.2

See application file for complete search history.

(56) References Cited

U.S. PATENT DOCUMENTS

| | | | |
|---|---|---|---|
| 4,583,234 A | | 4/1986 | Ramadan |
| 5,845,226 A | * | 12/1998 | Ajima ........................ 701/208 |
| 5,902,347 A | * | 5/1999 | Backman et al. ............ 701/200 |
| 6,192,072 B1 | | 2/2001 | Azadet et al. |
| 6,249,544 B1 | | 6/2001 | Azazzi et al. |
| 6,252,904 B1 | | 6/2001 | Agazzi et al. |
| 6,363,112 B1 | | 3/2002 | Azadet et al. |
| 2001/0022813 A1 | | 9/2001 | Tan et al. |
| 2001/0043745 A1 | * | 11/2001 | Friederich et al. .......... 382/232 |
| 2002/0009135 A1 | | 1/2002 | Omura et al. |
| 2002/0083396 A1 | | 6/2002 | Azadet et al. |
| 2002/0133560 A1 | * | 9/2002 | Hara .......................... 709/213 |
| 2002/0172276 A1 | | 11/2002 | Tan et al. |
| 2003/0016770 A1 | | 1/2003 | Trans et al. |
| 2003/0058955 A1 | | 3/2003 | Raghavan |
| 2003/0063664 A1 | | 4/2003 | Bodenschatz |
| 2003/0067865 A1 | | 4/2003 | Gross et al. |
| 2003/0115541 A1 | | 6/2003 | Azadet et al. |

FOREIGN PATENT DOCUMENTS

| | | |
|---|---|---|
| EP | 0 324 542 A2 | 7/1989 |
| EP | 0 801 342 A2 | 10/1997 |
| JP | 6-119265 | 4/1994 |
| JP | 11-247917 | 9/1999 |
| KR | 1998-50576 | 9/1998 |

OTHER PUBLICATIONS

"A Redundant Multi-Valued Logic for 10Gb/s CMOS Demultiplexer IC", Tanabe et al., ISSCC 2001 IEEE International Solid=State Circuits Conference, Digest of Technical Papers, pp. 220-221, 449-450, 14 slides.

* cited by examiner

*Primary Examiner*—Keith Ferguson
(74) *Attorney, Agent, or Firm*—McDermott Will & Emery LLP

(57) ABSTRACT

A mobile terminal for automatically decompressing a prescribed application program based on the location of the mobile terminal. A table is created to indicate relationships between application programs and their respective corresponding locations. The mobile terminal constantly acquires information of its own location. Based on the information of the table and the location of the mobile terminal, the corresponding application program is decompressed and ready to be used by the user.

11 Claims, 9 Drawing Sheets

| NAME OF LOCATION (401) | LOCATION RANGE (LATITUDE) (402) | LOCATION RANGE (LONGITUDE) (402) | IDENTIFIER OF APPLICATION PROGRAM (403) |
|---|---|---|---|
| HOME | Lat1_start ~ Lat1_end | Lon1_start ~ Lon1_end | MAIL |
| STATION | Lat2_start ~ Lat2_end | Lon2_start ~ Lon2_end | WEB |
| .. | .. | .. | .. |

FIG.9

| IDENTIFIER OF APPLICATION PROGRAM (901) | LOCATION OF USE (902) | DAY AND TIME OF USE (903) |
|---|---|---|
| MAIL | 23° 46' 00", 133° 35' 25" | 2002.5.26.18:56 |
| CAMERA | 23° 44' 51", 133° 34' 56" | 2002.5.27.10:08 |
| WEB | 23° 44' 50", 133° 34' 43" | 2002.5.27.10:23 |
| .. | .. | .. |

LOCATION OF LATEST USE

FIG.12

TIME OF THE DAY FOR DECOMPRESSION

MOBILE TERMINAL AND CONTROL METHOD THEREFOR

BACKGROUND OF THE INVENTION

1. Field of the Invention

The present invention relates to mobile terminals such as mobile phones and PDAs (personal Digital Assistants), and their control methods. In particular, it relates to a technique for acquiring location information of a user (mobile terminal) and controlling so as to automatically decompress a prescribed application program when the user enters a prescribed location range.

2. Description of the Related Art

In addition to the original function for talking, recent mobile phones are capable of sending and receiving e-mail and accessing the Internet.

Also, they have come to offer various functions such as the ones for enjoying games, downloading music data to listen to favorite music, and taking pictures by using their built-in cameras.

Those mobile phones are further including, other than games, functions of showing 3D (Three Dimension) characters on their standby displays, and programs for such applications are expanding up to about 100 Kbytes in size.

Further, recent mobile phones have come to have functions of using radio waves from GPS (Global Positioning System) satellites and base stations, and determining their locations. Usually, in determining locations by using GPS satellites, it is necessary to capture three or more GPS satellites outdoors. However, it is also possible to determine locations indoors according to the information from a plurality of base stations.

JP-A No. 247917/1999 discloses a device having a function of determining the current location of the device and displaying information related to the location such as shopping lists and rebate checks.

As described above, in addition to the use for talking, mobile phones are becoming multifunctional, being capable of sending and receiving e-mail, accessing the Internet and providing games, which require larger memory. However, since a mobile phone is a mobile device, the amount of memory available on it is limited. For reducing memory consumption alone, it is possible to compress/preserve application programs of the functions that are not always used and to decompress/run such programs when using them. However, in this method, whenever using an application program, a user has to wait while the program is being decompressed, which makes the user feel uncomfortable. Further, when the user doesn't have enough time, there occur problems such that the user can't use the application program, etc.

SUMMARY OF THE INVENTION

According to the present invention, in order to solve the above problems, not only application programs which are rarely used are compressed and preserved but also a specific application program is automatically decompressed depending on the location of the user (mobile terminal). In this way, application can be used with reduced memory consumption and without waiting time for decompressing the application.

To be specific, a mobile terminal of the present invention comprises a location-information acquiring means measuring a current location of the user, a location-information analyzing means determining whether or not the measured location is within a range set by the user, a correspondence table storing correspondences between the prescribed location range and application programs to be used in such a range, a compressed-application preserving means preserving compressed application programs, a decompressing means decompressing the application programs, and a decompressed-application storing means storing the decompressed application programs.

Other and further objects, features and advantages of the invention will appear more fully from the following description.

DESCRIPTION OF THE PREFERRED EMBODIMENTS

Referring to the drawings, embodiments of the present invention will now be described.

Figure 1:
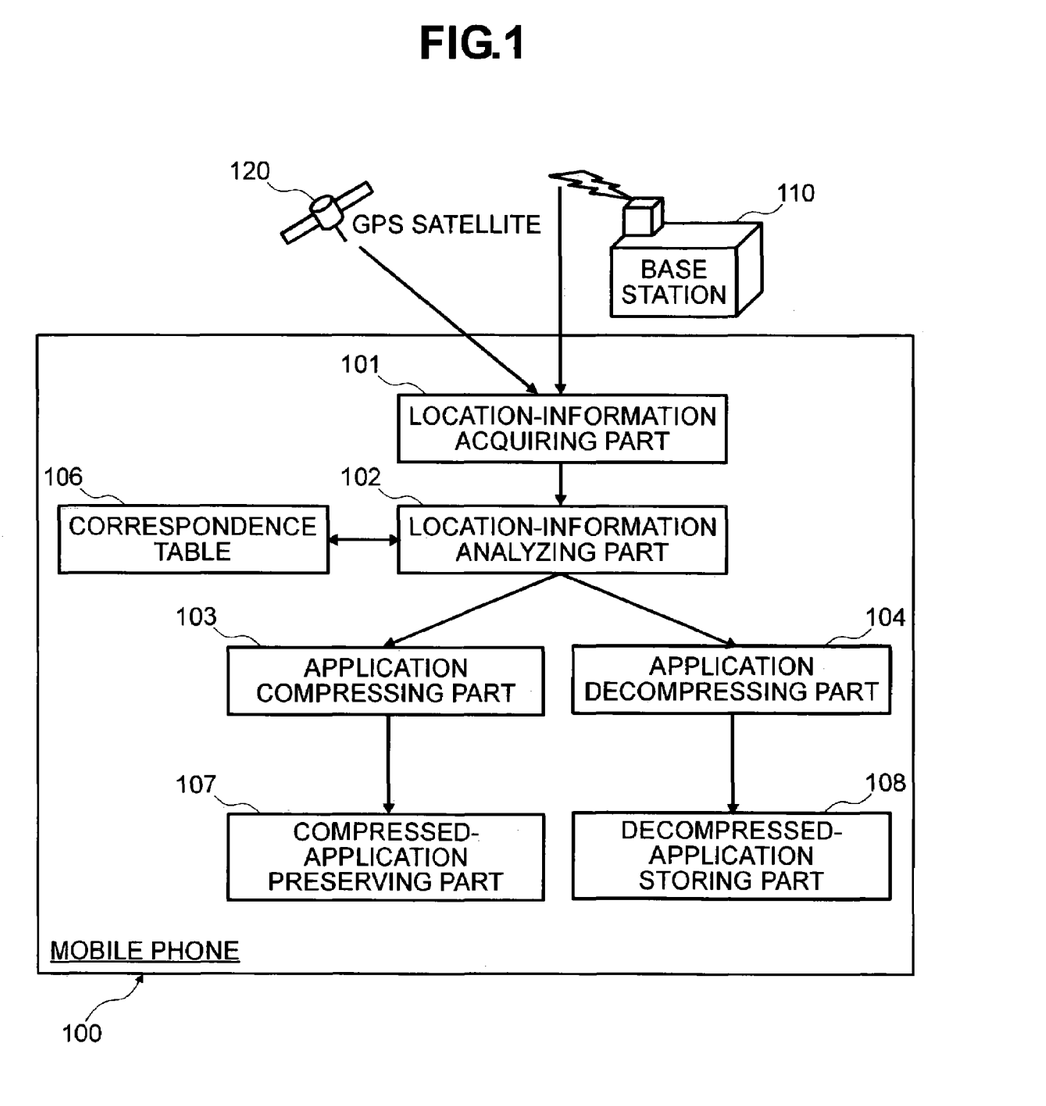
FIG. 1 is a block diagram showing a means necessary for a mobile phone of an embodiment of the invention to acquire location information making use of radio waves from a base station and GPS satellites, and to decompress an application program depending on the location information of a user.

FIG. 1 is a block diagram illustrating a means necessary for a mobile phone according to an embodiment of the invention to acquire location information making use of radio waves from a base station and GPS satellites and to decompress application programs depending on the location information of the user.

A mobile phone 100 of the present invention comprises a location-information acquiring part 101, a location-information analyzing part 102, an application compressing part 103, an application decompressing part 104, a compressed-application preserving part 107 preserving compressed application programs, a decompressed-application storing part 108 storing decompressed application programs, a correspondence table 106 rewritably storing (registering) the correspondence between the prescribed location range and application programs to be used within the range, etc.

The location-information acquiring part 101 sends and receives information to and from a location server not shown (a server providing location information making use of GPS satellites and a base station) and a GPS (Global Positioning System) satellite 120, and acquires coordinate data of the location of a mobile phone 100 acquired according to the latitude and longitude.

Figure 4:
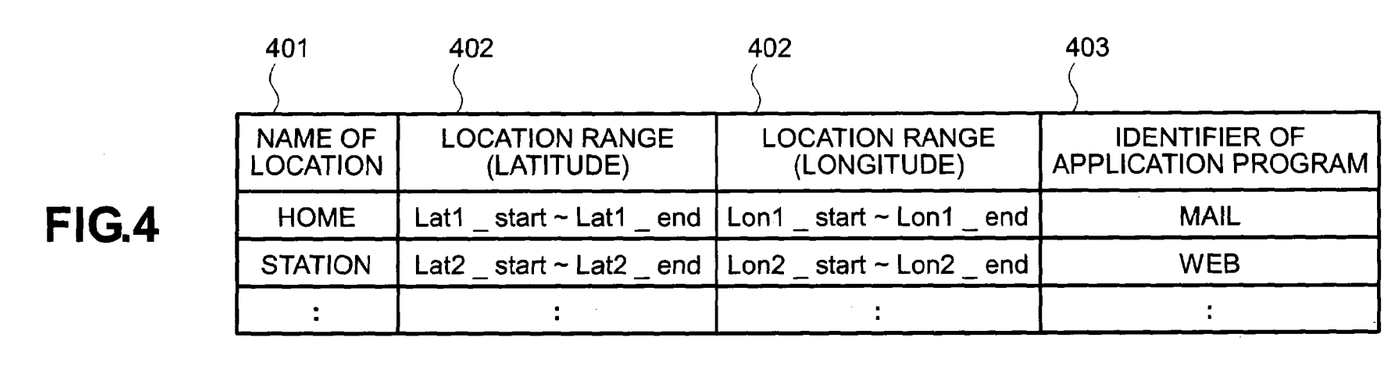
FIG. 4 illustrates an example of contents on the correspondence table used by the mobile phone of an embodiment of the present invention.

The correspondence table 106 is a table for showing correspondences between a location range of the mobile phone and application programs to be decompressed within the location range, and the application program to be decompressed is determined by using this table. As shown in FIG. 4, the correspondence table 106 includes sections such as a location name 401, a location range 402, and identifiers 403 of application programs. The location range 402 includes sections such as a location range (longitude) and a location range (latitude). Since a user cannot recognize the location just by looking at figures showing the latitude and longitude, names are given to location ranges 402 for the convenience of the user. They are the location names 401.

For example, a location name of "home" is given to the location range of latitudes 23°45'05"–23°46'00" and longitudes 133°35'25"–133°36'20". When a user selects "home" on a mobile-phone display, it means to select a location range of latitudes 23°45'05"–23°46'00" and longitudes 133°35'25"–133°36'20". Accordingly, changes of application programs to be decompressed at "home" can be easier to make.

The location-information analyzing part 102 refers to the location information of the mobile phone acquired by the location-information acquiring part 101 and contents on the correspondence table 106, and analyzes whether or not there is an application program to be decompressed.

When the location acquired by the location-information acquiring part 101 falls within the range of latitudes and longitudes of the correspondence table 106, if the application program corresponding to the location range has not been decompressed yet, an instruction is given to the application decompressing part 104. Upon receiving the instruction, the application decompressing part 104 acquires a corresponding application program from the compressed-application preserving part 107 and decompresses the program. The decompressed application program is stored in the decompressed-application storing part 108, where the application program is ready to be run. In other words, the application program extracted in the decompressed-application storing part 108, which serves as a work area, is in a standby state. With proper keystrokes of a user, an initial screen of the application program is ready to be called on a mobile-phone display.

Further, in order to let the user recognize that the application program is in a standby state, an indication on a display panel, a sound or a vibration may be automatically outputted. In such cases, a mode of output of notification is desirably different from that of notification for arrival of calls or e-mail. Furthermore, whether or not a mode to notify the user of the standby state of the application program should be taken may be selectively set according to the demand or preference of the user.

In the case where the location acquired by the location-information acquiring part 101 is not within the location range 402 on the correspondence table 106, the location-information analyzing part 102 (or an upper determining means not shown receiving information from the location-information analyzing part 102) gives an instruction to the application decompressing part 104 to delete all the decompressed application programs from the decompressed-application storing part 108. However, when there are active application programs, such application programs are not deleted from the decompressed-application storing part 108 (As to judge whether or not an application program is active, for example, when keys are not pressed at all by a user for a certain period of time, it is determined that the application program is not active). Upon receiving the instruction to delete, the application decompressing part 104 finds out the corresponding application program from the decompressed-application storing part 108 and deletes the decompressed application program. Further, the compressed application program corresponding to the application program deleted from the decompressed-application storing part 108 is stored in the compressed-application preserving part 107.

When an application program is installed on a mobile phone, the application compressing part 103 compresses the application program according to the prescribed compression format, and has the compressed-application preserving part 107 preserve the compressed application program. Further, when the application program is pre-installed on the mobile phone, the compressed application program can be directly written into the compressed-application preserving part 107 without going through the application compressing part 103.

When using a mobile phone shown in FIG. 1, first, the user prepares contents to be set on the above correspondence table 106 in advance according to the operational procedures described later. On the correspondence table 106, as shown in FIG. 4, location names 401, location ranges 402, and identifiers 403 of application programs to be decompressed within the location range are registered.

Figure 2:
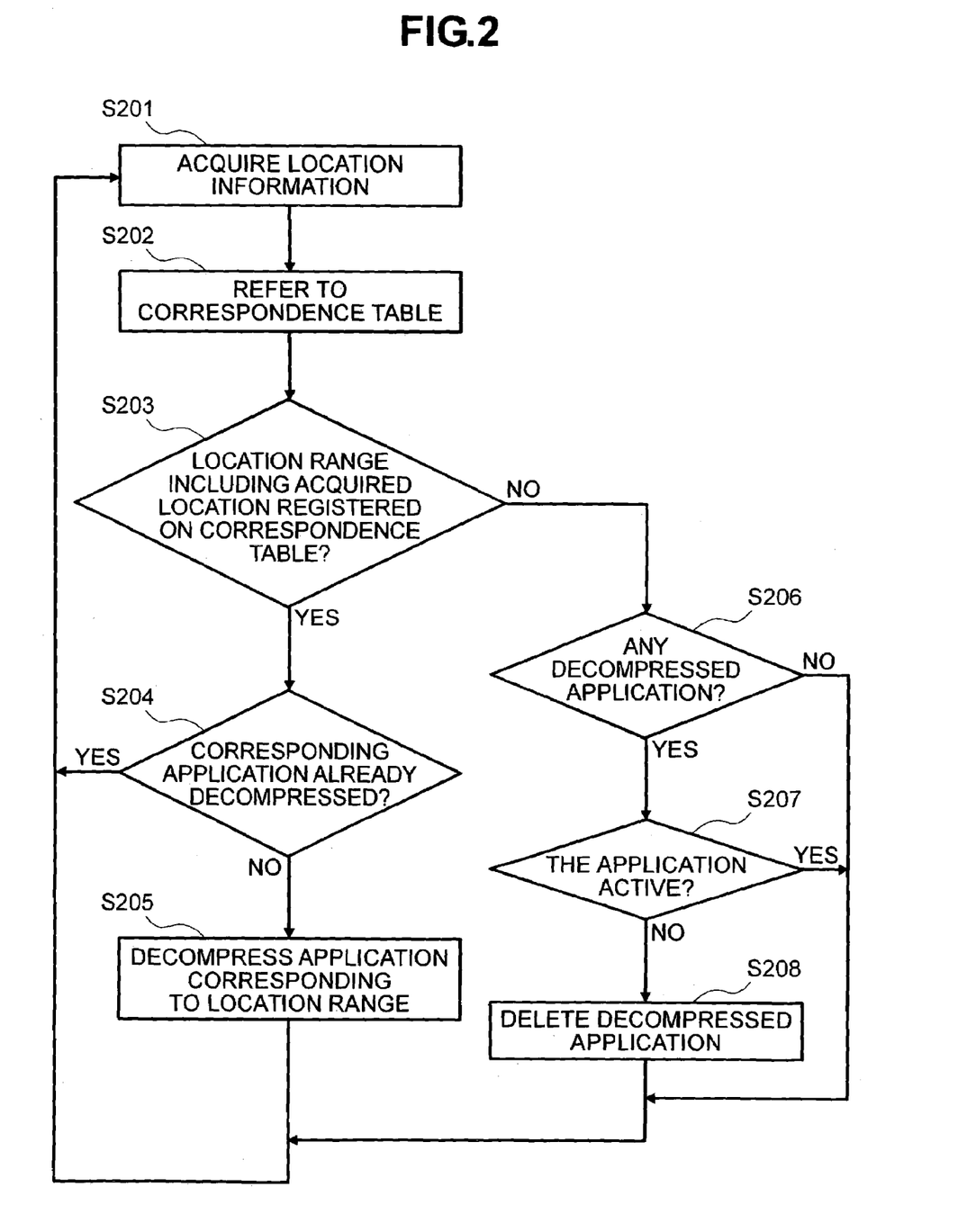
FIG. 2 is a flowchart showing a first example of operational procedures wherein the mobile phone of an embodiment of the invention acquires location information of the user, decompress application programs to be decompressed at the location, and delete application programs to be deleted among the decompressed application programs.

FIG. 2 is a flowchart showing a first example of the steps taken by the mobile phone of the present embodiment to acquire location information of the user, decompress application programs to be decompressed at the location, and delete application programs to be deleted among the decompressed application programs.

First, the location information of the mobile phone is acquired by the location-information acquiring part 101 (step S201). Then, the correspondence table 106 is referred to (step S202), and it is checked whether or not the location range in which the acquired location is included is registered (step S203). If it is registered, the processing routine advances to step S204, and if not, to step S206. Namely, when the latitude of the acquired location is within the location range (latitude range) of the correspondence table 106 and the longitude of the acquired location is within the location range (longitude range) of the correspondence table 106, it is determined that the location range in which the acquired location is included is registered on the correspondence table 106, and if not, it is determined that the location range is not registered on the correspondence table 106.

When the location range in which the acquired location is included is registered on the correspondence table 106, the correspondence table 106 is referred to in step S204, and it is checked whether or not the application program to be decompressed in the location range in which the acquired location is included is already decompressed. If the program has been decompressed, the processing routine returns to step S201. If the program has not been decompressed, the processing routine advances to step S205 and, after decompressing the application program, the processing routine returns to step S201. Namely, after having the application decompressing part 104 decode the application program preserved in the compressed-application preserving part 108 and storing it in the decompressed-application storing section 107 so that the application program is ready to be run (in a standby state), the processing routine returns to step S201.

Further, the compressed-application preserving part 107 can be a region such as ROM which a user can't write in, or it can be a RAM region which the user can write in. Further, it can be a removable storage device such as a memory card. The decompressed-application storing part can be rewritable RAM or a memory card.

When the location range in which the acquired location is included is not registered on the correspondence table 106, it is checked in step S206 whether or not there is a decompressed application program. If there is, the processing routine advances to step S207, and if not, returns to step S201. In step S207, it is checked whether or not the application program is active. If it is active, the processing routine returns to step S201. If it is not active, in step S208, the application program is deleted from the decompressed-application storing part 108, and the processing routine returns to step S201.

As described earlier, the cases when the location range in which the acquired location is included is not registered on the correspondence table 106 (the cases when determined to be "No" in step S203) could be as follows: One is the case when the user was once in the registered location range 402 and then moved out of the registered location range 402. The other is the case when the user was not in the registered location range 402 at all.

In the former case, since the application program corresponding to the registered location range where the user was in must have been decompressed, at least one application program is in a decompressed state. It is checked whether or not there is a decompressed application program (step S206), and the decompressed application program is deleted. Since the user could be using the application program, the application program is deleted (step S208) after confirming that the application program is not in use (step S207).

In the latter case, since the user is not at all in the registered location range 402, there could be no decompressed application program. However, the user may go out of the registered range 402 with the decompressed application program still being used. Let us consider that a "station" is registered in the location range 402 and "mail" is registered on the application. If the user is using "mail" at the "station" and then gets on the train to move, the user goes out of the location range 402 "station" while using the "mail." In such a case, the application program is not deleted from the decompressed-application storing part 108. Later, when the user stops using the application program, the decompressed application program is deleted from the decompressed-application storing part 108 by going through steps S206, S207 and S208.

In this way, according to the mobile phone of the present embodiment, when the user is not in the location range 402 registered on the correspondence table 106, all the application programs not being used by the mobile phone are compressed. Only within the location range 402 registered by the user, application programs corresponding to the location range are automatically decompressed. When the use moves out of the location range registered on the correspondence table 106, the application program is deleted from the decompressed-application storing part 108 immediately if the application program is not active, and as soon as the application program is stopped if the program is active.

Figure 5:
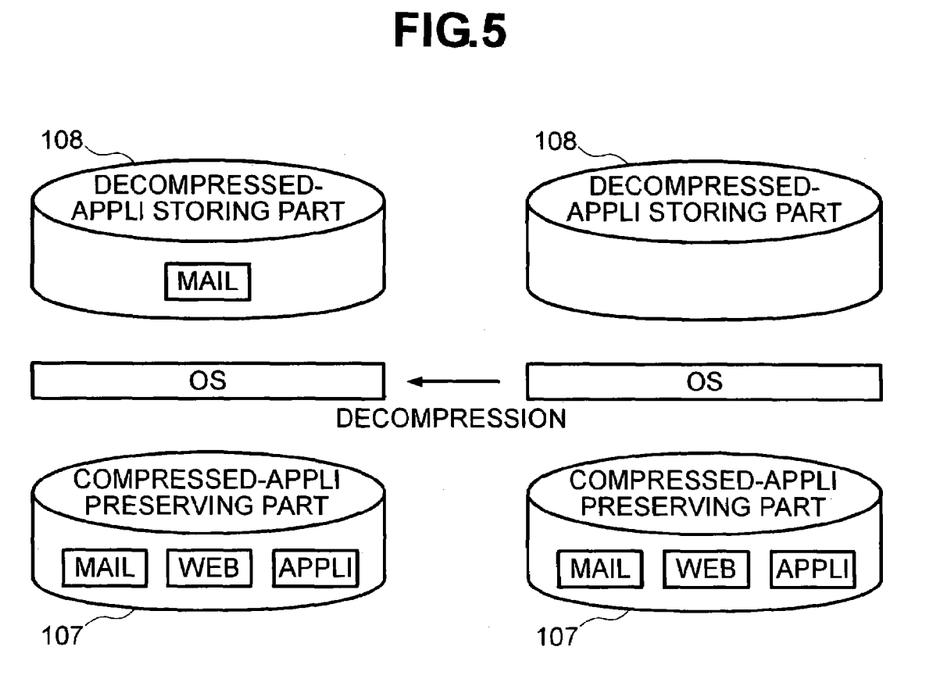
FIG. 5 schematically illustrates a state in which an application program on the mobile phone of an embodiment of the invention compressed and stored in the compressed-application preserving part is now decompressed and extracted in the decompressed-application storing part.

FIG. 5 schematically shows an application program compressed and stored in the compressed-application preserving part 107 is, under the control of an OS of the mobile phone, now decompressed and extracted in the decompressed-application storing part 108.

Now, a second example of the step will be described, wherein the mobile phone of the present embodiment acquires location information of the user, decompresses application programs to be decompressed at the location, and deletes application programs to be deleted among the decompressed application programs.

The user may be moving near the border of the location range 402 registered on the correspondence table 106, and may repeatedly come in and go out of the registered location range 402 in a short period of time. In such a case, in the operation of the previously described first example, decompression/deletion of the application program have to be repeated a plurality of times, causing the battery to be consumed. The second example shows how to avoid such useless decompression.

Figure 6:
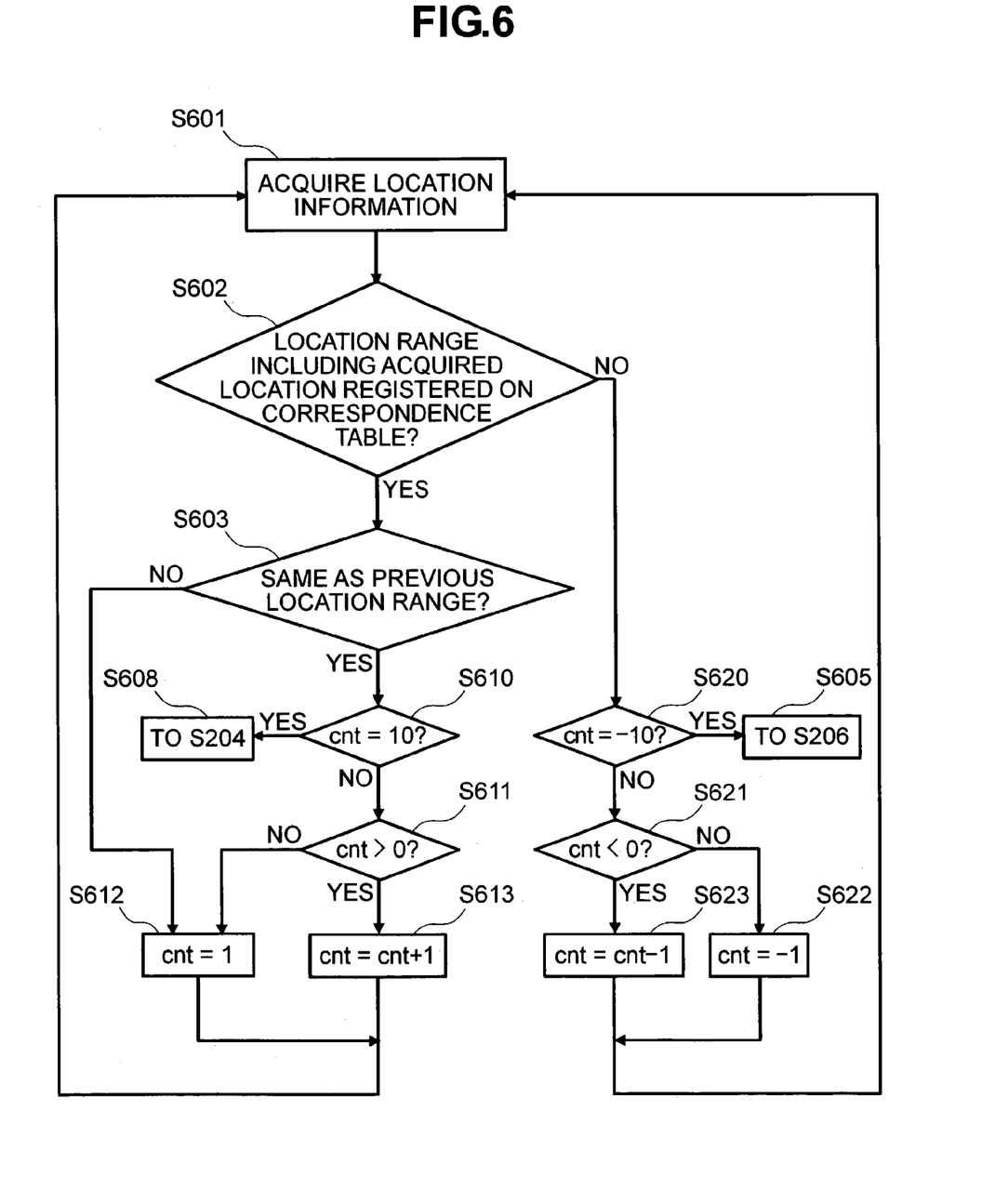
FIG. 6 is a flowchart showing a process flow of an essential part in a second example of operational procedures for the mobile phone of an embodiment of the present invention.

FIG. 6 is a flowchart showing a (characteristic) process flow of an essential part of the second example. The process flow shown in FIG. 6 corresponds to the process flow from step S201 to step S203 in FIG. 2. In FIG. 6, the process flow corresponding to step S204 through step S208 is omitted. Namely, by replacing step S201 to step S203 in FIG. 2 with the process flow in FIG. 6, a flowchart showing a whole procedure of the second embodiment can be obtained.

In the example shown in FIG. 6, the user is judged to be in the same registered location range only when the acquired location information is found to be in the prescribed location range (within the same location range) registered on the correspondence table 106 10 times in succession. Further, the user is judged to be out of the registered location range only when the acquired location information is out of the location range registered on the correspondence table 106 10 times in succession.

In this judgement, a variable named "cnt" is used. If the location range in which the acquired location information is included is registered on the correspondence table 106, and this location range is the same as the previous range, the value of cnt is increased by 1 (one). If the location range in which the acquired location information is included is not registered on the correspondence table 106, the value of cnt is decreased by 1 (one). However, even in the case where the location range is registered on the correspondence table 106, the value of cnt is set to 1 (one) if the value of cnt is negative. Further, even in the case where the location range is not registered on the correspondence table 106, if the value of cnt is positive such value is set to −1 (minus one).

Accordingly, only when the location range in which the acquired location information is included is registered on the correspondence table 106 and this location range is the same as the previous range, or when the location range in which the acquired location information is included is not registered on the correspondence table 106, the absolute value of cnt increases. Contrarily, when location information in the location range registered on the correspondence table 106 and location information in the location range which is not registered are acquired alternately the absolute value of cnt is not exceeding 2 (two).

In the process flow of FIG. 6, the value of cnt is increased or decreased until the absolute value of cnt reaches 10 (ten). When the value of cnt reaches 10 (ten), the processing routine advances to the process corresponding to step S204 of FIG. 2. Further, when the value of cnt reaches −10 (minus ten), the processing routine advances to the process corresponding to step S206 of FIG. 2.

Now, variations of the value of cnt will be described by referring to the case where a user is moving near the border of the location range 402 registered on the correspondence table 106, and location information included in the location range registered on the correspondence table 106 and location information which is not included in the location range registered on the correspondence table 106 are alternately acquired.

The initial value of cnt is set to 1 (one). If location information is acquired in step S601, the location range in which the acquired location information is included is registered on the correspondence table 106 in step S602, and the location range is the same range as the previous one in step S603, the processing routine advances to step S610. Since cnt is not 10 (ten) here (determined to be "No" in step S610), the processing routine advances to step S611. Since cnt is greater than 0 (zero) (determined to be "Yes" in step S611), the value of cnt is increased by 1 (one) to become 2 (two) in step S613. Therefore, the processing routine returns to step S601. If the location range in which the acquired location information is included is not registered on the correspondence table 106, the processing routine advances from step S602 to step S620. Since the value of cnt is not −1 (minus one) (since determined to be "No" in step S620), the processing routine advances to step S621. Further, since the value of cnt is not less than 0 (zero) in step S621 (determined to be "No" in step S621), the value of cnt becomes equal to −1 (minus one) in step S622. Therefore, the processing routine returns to step S601.

Thus, in the case of alternately acquiring location information included in the location range registered on the correspondence table 106 and the location information which is not included in the location range registered on the correspondence table 106, the absolute value of cnt does not exceed over 2 (two), not reaching the process in which decompression or deletion of application programs is executed. Namely, the processing routine does not reach the decompressing process or the deletion process of the application program until the absolute value of cnt is increased to 10 (ten). Therefore, even if the user repeatedly comes into and goes out of the registered location range 402 a plurality of times in a short period of time, useless repetition of decompression/deletion of the application program can be avoided.

In the example of FIG. 6, decompression or deletion of the application program is not executed until the absolute value of cnt reaches 10 (ten). However, in order to adjust the timing of decompression and deletion, it is possible to set up step S610 and step S620 as "cnt=max_num?" and "cnt=−max_num?", respectively, so that the user can determine the value of max_num. If the max_num is set greater, the frequency to execute decompression or deletion of the application program while the user is moving is decreased. Contrarily, when max_num is set smaller, the frequency to execute decompression or deletion is increased.

Now, a third example of the step will be described, wherein the mobile phone of the present embodiment acquires location information of the user, decompresses application programs to be decompressed at the location, and deletes the application program to be deleted among the decompressed application programs.

Since it is battery-consuming to acquire location information all the time, it is necessary to provide a function of changing an interval between acquisition of location information. The third example is the one having a function to change the interval between acquisition of location information.

Figure 7:
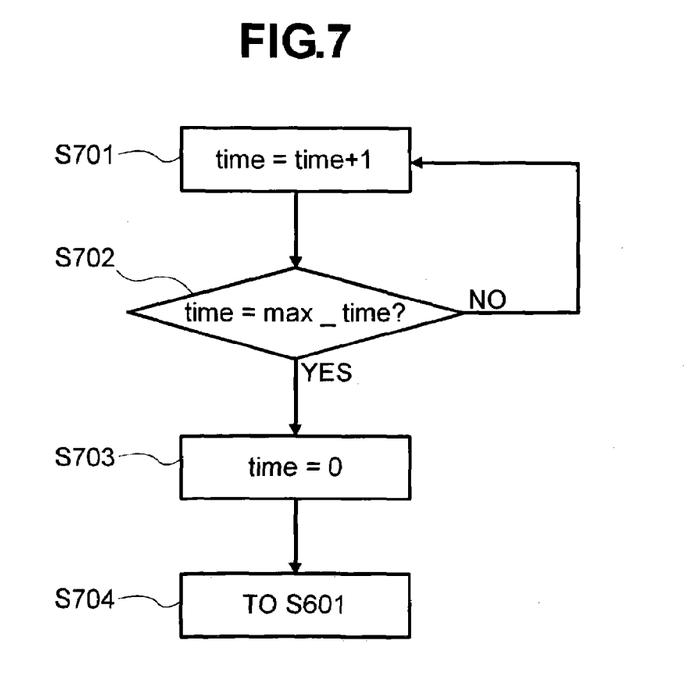
FIG. 7 is a flowchart showing a process flow of an essential part in a third example of operational procedures for the mobile phone of an embodiment of the present invention.

FIG. 7 is a flowchart showing a (characteristic) process flow of an essential part of the third example. The process flow shown in FIG. 7 is the one only for making the interval longer between acquisition of location information. The process flow after acquisition of the location information is omitted (the process flow after the acquisition of the location information is the same as the first example of FIG. 2 or the second example of FIG. 6).

For instance, the process flow of the third example in FIG. 7 is carried out before executing the process of step S601 in FIG. 6. The flowchart showing the overall operational procedures of the third example is obtained by returning the process which is supposed to return to step S601 as in step S613 and step S623 in FIG. 6 to step S701 in FIG. 7.

As shown in FIG. 7, in step S701, the value of time is increased on a one-by-one basis and, in step S702, whether or not time=max_time is achieved is monitored. When time=max_time is achieved, in step S703, the value of "time" is set to "0" and the processing routine advances to step S601 of FIG. 6.

If the process of step S701 is repeated 1,000 times a second, the interval between acquisition of location information and the next acquisition of location information is max_time milliseconds. If "max_time" is set to be greater, the interval between acquisition of location information gets longer, and if "max_time" is set to be "smaller," the interval gets shorter. It is possible for "max_time" to be determined by the user. The method of this operation by the user will be described later.

In the above example, the user is supposed to register location ranges on the correspondence table 106. However, since it is troublesome for the user to register a location range and an identifier of the application program to be decompressed in the location range every time, it is conceivable to provide a function of automatic registration. An example of this function of automatic registration will now be described.

In the case of being provided with an automatic registration function, when the user always uses the same application program at the same place, such a place and an identifier of the application program are automatically registered on the correspondence table 106. For this automatic registration, a use-of-application history table is prepared.

Figure 9:
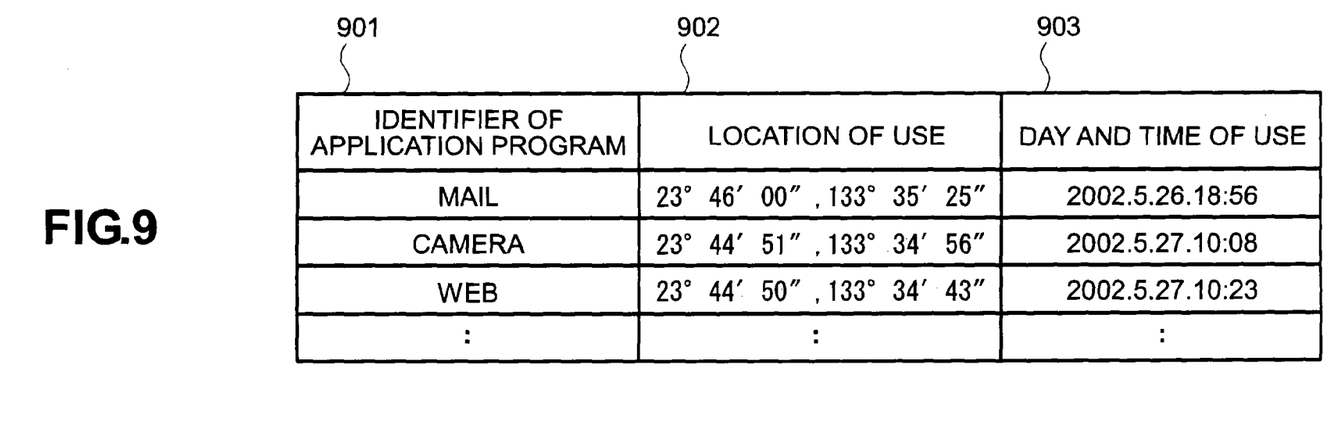
FIG. 9 illustrates an example of contents on the use-of-application history table to be used by the mobile phone of an embodiment of the present invention.

FIG. 9 shows an example of the use-of-application history table on which the correspondence between application programs used by the user and location/date and time of the use are summarized. The use-of-application history table includes sections such as application program identifier 901, use location 902, and date and time 903 of the use.

Figure 10:
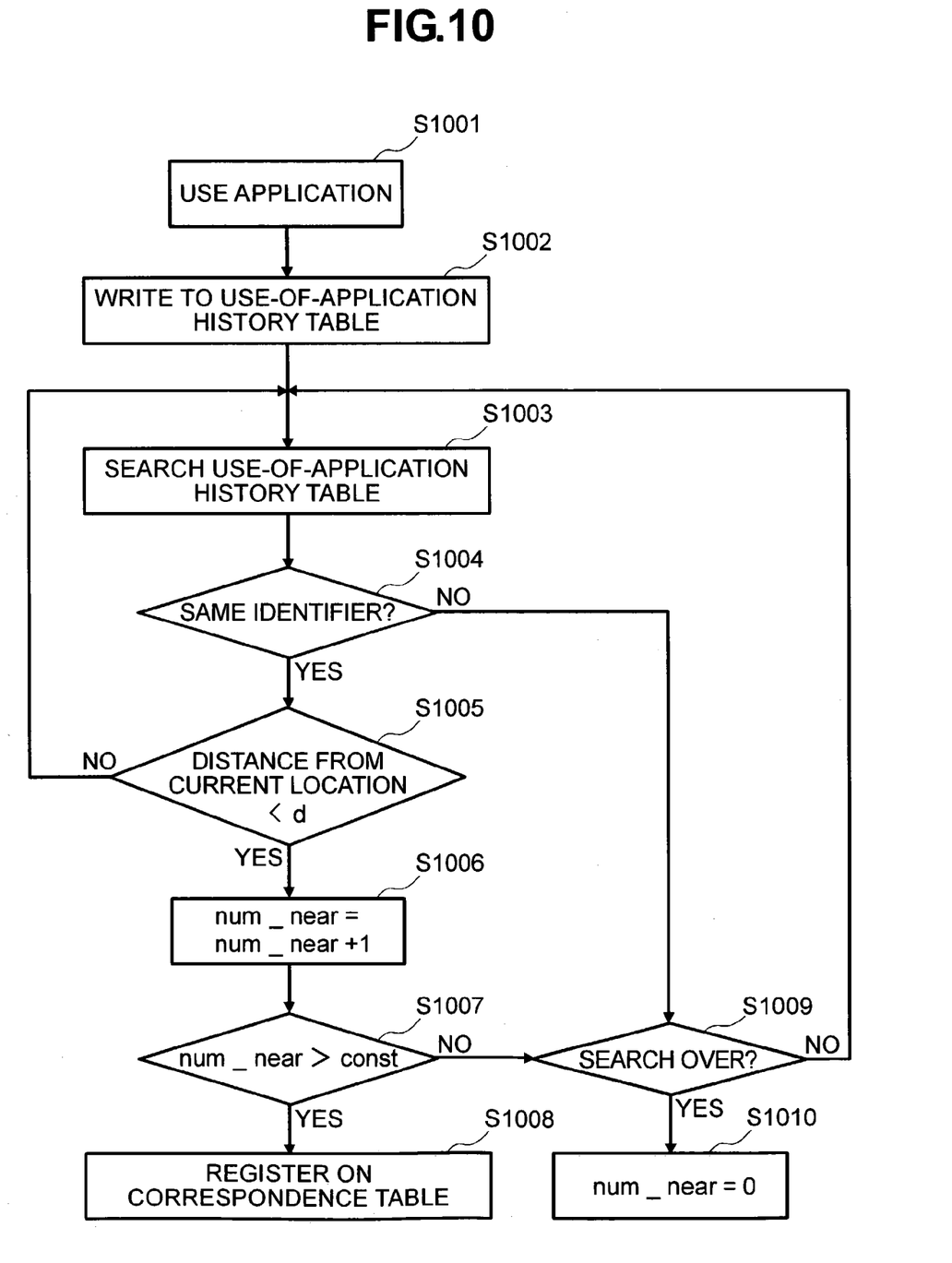
FIG. 10 is a flowchart showing a step to automatically register a location range and an identifier of an application program on the correspondence table in the mobile phone of an embodiment of the present invention.

FIG. 10 is a flowchart showing a step to automatically register the location range and identifiers of the application programs on the correspondence table 106. The process flow of FIG. 10 is carried out not when the mobile phone automatically decompresses the compressed application program according to the location, but when the user manually decompresses the compressed application program and uses it.

When the user properly presses keys to select/designate a compressed application program and gives an instruction to use it, the designated application program is decompressed by the application decompressing part 104. The application program is then extracted in the decompressed-application storing part 108 and is used by the user. When the user uses the application program, an identifier of the application program used by the user, location information of the use, and time/date of the use are recorded on the use-of-application history table as shown in FIG. 9 (step S1002).

Except for the section in which data are most recently written, sections of identifiers 901 on the use-of-application history table are sequentially searched (step S1003), and checked whether or not they are the sections of the same identifiers as those in which data are most recently written (the identifiers of the application programs that the user is currently using)(step S1004). If they are the same identifiers, the processing routine advances to step S1005, and if not, advances to step S1009.

In step S1005, a location of use in the past 902 and the most recently written location of use (current location of the use) 902 are compared. Then, it is checked whether or not a distance between the location of use in the past and the current location of use is smaller than the prescribed value "d." If it is less than "d," the processing routine advances to step S1006, and if not, returns to step S1003. 1 (one) is added to num_near in step S1006, and the processing routine advances to step S1007.

In step S1007, it is checked whether or not the value of num_near has exceeded the prescribed "const." If num_near is greater than "const," the processing routine advances to step S1008 and if not, advances to step S1009. In step S1008, the identifier of the application program is entered in a section of the application identifier 403 on the correspondence table 106. Further, data of the location range calculated according to the prescribed conditions is entered in a section of the location range 402 on the correspondence table 106, and the process is terminated.

Further, in step S1009, it is checked whether or not the search of the use-of-application history table is finished. If the search is not finished, the processing routine returns to step S1003. If the search is finished, in step S1010, the value of num_near is returned to "0" and the process is terminated.

Some more explanations will be given to the automatic registration shown in FIG. 10. For example, "mail" is used at the station on the way to school and then "mail" is used again at the same station on the way home from school, the distance between a location of use 902 registered according to the use on the way to school and a location of use 902 registered according to the use on the way home is relatively small. If the distance is smaller than "d," 1 (one) is added to num_near and the value of num_near becomes 1 (one). If there is no other locations of use 902 with smaller distance, the processing routine returns to "0."

Further, when "mail" is used at the same station on the next day, if the distance between a location of use 902 registered then and a location of use 902 registered on the previous day is small and either of the distances is smaller than "d," 1 (one) is added to num_near twice and the value of num_near becomes 2 (two). Thus, if the same application program is used at the same location, the value of num_near gets greater.

Figure 11:
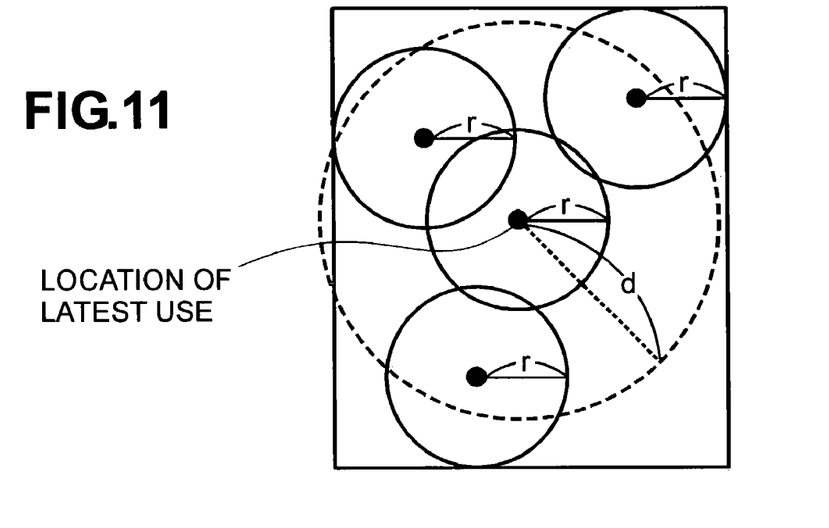
FIG. 11 illustrates an example of the location range when the mobile phone of an embodiment of the invention automatically register data of the location range on the correspondence table.

Further, when the value of num_near gets greater than the prescribed "const" (determined to be "Yes" in step S1007), an identifier of the application program is entered in a section of the application identifier 403 on the correspondence table 106. Further, in the location of use 902 registered most recently on the use-of-application history table and all the locations of use 902 of the same identifier within the distance "d" from the location of use 902, the range of a circle having a prescribed radius "r" is calculated respectively, and a rectangular range including all the circles is entered in the section of the location range 402 on the correspondence table 106 (see FIG. 11).

Further, even after the automatic registration of the identifier of the application program and the location range on the correspondence table 106, contents of the registration on the use-of-application history table is preserved. Therefore, even when the user manually decompresses and uses the application program whose identifier is already registered on the correspondence table 106, the process flow of FIG. 10 is also carried out. As a result, with respect to the location range previously determined and registered on the correspondence table 106 and the location range determined this time, even if partially overlapped, when they do not match with each other, the rectangular range including all the previously determined location range and the location range determined this time are rewritten on the correspondence table 106 as a new location range, and updated to be registered. In this way., the location range corresponding to identifiers of application programs is expanded and updated to be registered, being revised to be more reliable and desirable data as a location range.

Now, a fourth example of the step will be described wherein the mobile phone of the present embodiment acquires location information of the user, decompresses application programs to be decompressed at the location and deletes application programs to be deleted among the decompressed application programs.

In the previously described first to third examples, if the location range in which acquired location is included is registered on the corresponding table 106, regardless of time of the day, an application program with an identifier corresponding to the location range registered on the corresponding table 106 is decompressed. However, even at the same location, application programs to be used may vary depending on a day of the week or time of the day, such as a case at home where "mails" is used at night during week days and "web" is used during day time on weekends. In that case, by also registering time and day of the use on the use-of-application history table shown in FIG. 9 on the correspondence table 106, the application program to be decompressed can be discriminated according to the location range and time of the day. Further, by registering the day of the week (not shown) when the application is used on the use-of-application history table and registering such data also on the correspondence table 106, the application program to be decompressed can be discriminated according to the location range and day of the week or can be discriminated according to the location range, time of the day and day of the week. In the fourth example, such a delicate control of the decompression is shown.

Figure 12:
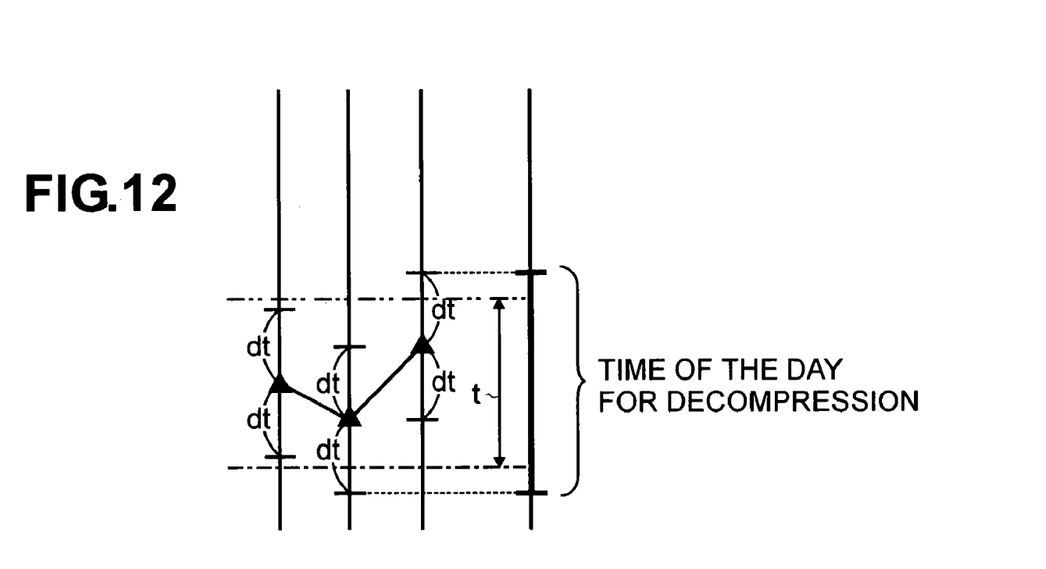
FIG. 12 illustrates an example of time of the day when the mobile phone of an embodiment of the invention automatically register data of the time of the day on the correspondence table.

As described above, an example to discriminate an application program to be decompressed according to the location range and time of the day will be described. First, referring to FIG. 10, a step to register contents of the use-of-application history table on the correspondence table 106 will be described. In this case, the judgement of step S1005 in FIG. 10 is set as "distance from the current location<d, and time difference from current time<t?" In such conditions, "t" is a prescribed constant. In this step, when the distance between the location at which the same application program was used in the past and the current location is smaller than "d" and difference between the time at which the same application program was used in the past and the current time is smaller than "t," the processing routine advances to step S1006. In this way, only the data related to the application program used at the same location and the same time of the day can be registered on the correspondence table 106. On that occasion, it is needless to say that during the process in step S1008 of FIG. 10, data of time of the day is also registered on the correspondence table 106. As the data for the time of the day, from the time and day 903 of the use most recently registered on the use-of-application history table and all of the time-and-day data 903 of use within the time "t" from the above time and day 903 of the use, the prescribed range of prescribed time difference "dt" is calculated and is registered as a time of the day in which the applications are decompressed (see FIG. 12).

Now, referring to FIG. 2, a step to decompress an application program will be described. In this regard, step S203 of FIG. 2 is defined as "location range in which the acquired location is included is registered on the correspondence table 106, and time at which the location is acquired is included in the range of time of the day for decompression registered according to the location range?" Thus, restriction can be given to the time of the day at which applications are decompressed.

Now, an example in which application programs to be decompressed are discriminated according to the location range, time of the day, and day of the week will be described. In addition to the location range, in the case where discrimination is made according to time of the day and day of the week, sections for day of the week are added to the use-of-application history table and the correspondence table 106, respectively.

First, referring to FIG. 10, a step to register contents of the use-of-application history table on the correspondence table 106 will be described. In this case, the judgement of step S1005 in FIG. 10 is defined as "the distance from current location<d, and the difference from the current time<t, and current day of the week matches the past day of the week on the use-of-application history table?" If the case fits the conditions, an identifier 403 of the application program, a location range 402, time of the day at which the above application is decompressed, and the applicable day of the week on the use-of-application history table are registered on the correspondence table 106, respectively.

Now, referring to FIG. 2, a step to decompress an application program will be described. In this regard, step S203 of FIG. 2 is defined as "a location range in which acquired location is included is registered on the correspondence table 106, time at which the location is acquired is included in the range of time of the day for decompression registered corresponding to the location range, and the day of the week on which the location acquired matches the day of the week for decompression registered corresponding to the location range?" Thus, only when the location range, time of the day, and day of the week respectively match their counterparts, the application program can be decompressed.

Figure 3:
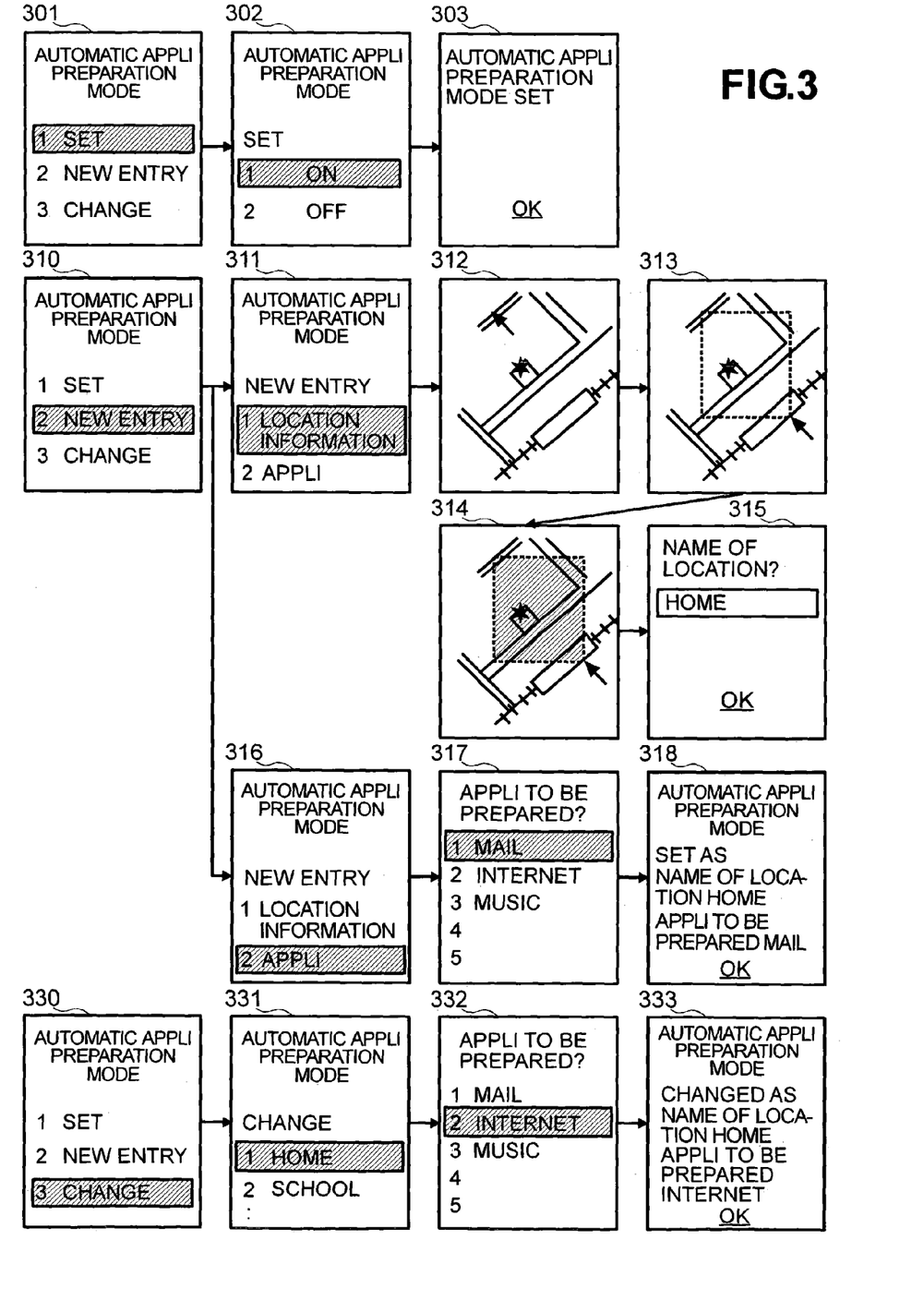
FIG. 3 illustrates transition examples of menu displays on the mobile phone of an embodiment of the present invention.

Now, referring to FIG. 3, an operating method for using functions of the mobile phone of the present embodiment will be described. FIG. 3 shows each example of display screens on the mobile phone of the present embodiment.

The menu display (display 301) with which functions of the invention (automatic decompression/automatic deletion of application programs according to the location; hereafter, called "the function") are set and executed includes sections such as "set," "new entry," and "change."

By selecting "set" on the menu display (display 301) and selecting "ON" on a display 302, the function can be used (display 303). Also, by selecting "OFF" on the display 302, the use of the function is terminated.

In order to use the function, at least the location range (location information) and an identifier of the application program to be decompressed are entered. On the menu display, "new entry" is selected (display 310), and "location information" is selected on a display 311. As the location of the user is displayed on a display 312, the range is designated by using an arrow (displays 312, 313). After determining the starting point, the end point is determined by moving the arrow. Accordingly, a rectangle with the starting point and the end point as its opposing angles is displayed (display 314), and the inner area of the rectangle is registered as the location range 402. The location range is checked on the display 314, and if acceptable, "OK" is pressed. On a display 315, a name is given to the selected location range 402.

Then, an application program to be decompressed is selected. "Appli" is selected on a display 316, and an identifier of the application program is selected on a display 317. Finally, the set (entered) name of the location and the identifier of the application program are checked (display 318), and if they are acceptable, "OK" is pressed.

When changing the entered contents, "change" is selected on the menu display (display 330). The entered location name 401 is shown on a display 331. For example, when the application program to be decompressed at "home" is to be changed, "home" is selected. Moving on to a display 332 and an identifier of the application program to be newly decompressed is selected. Then, the contents changed on a display 333 is checked and if acceptable, OK" is pressed.

Figure 8:
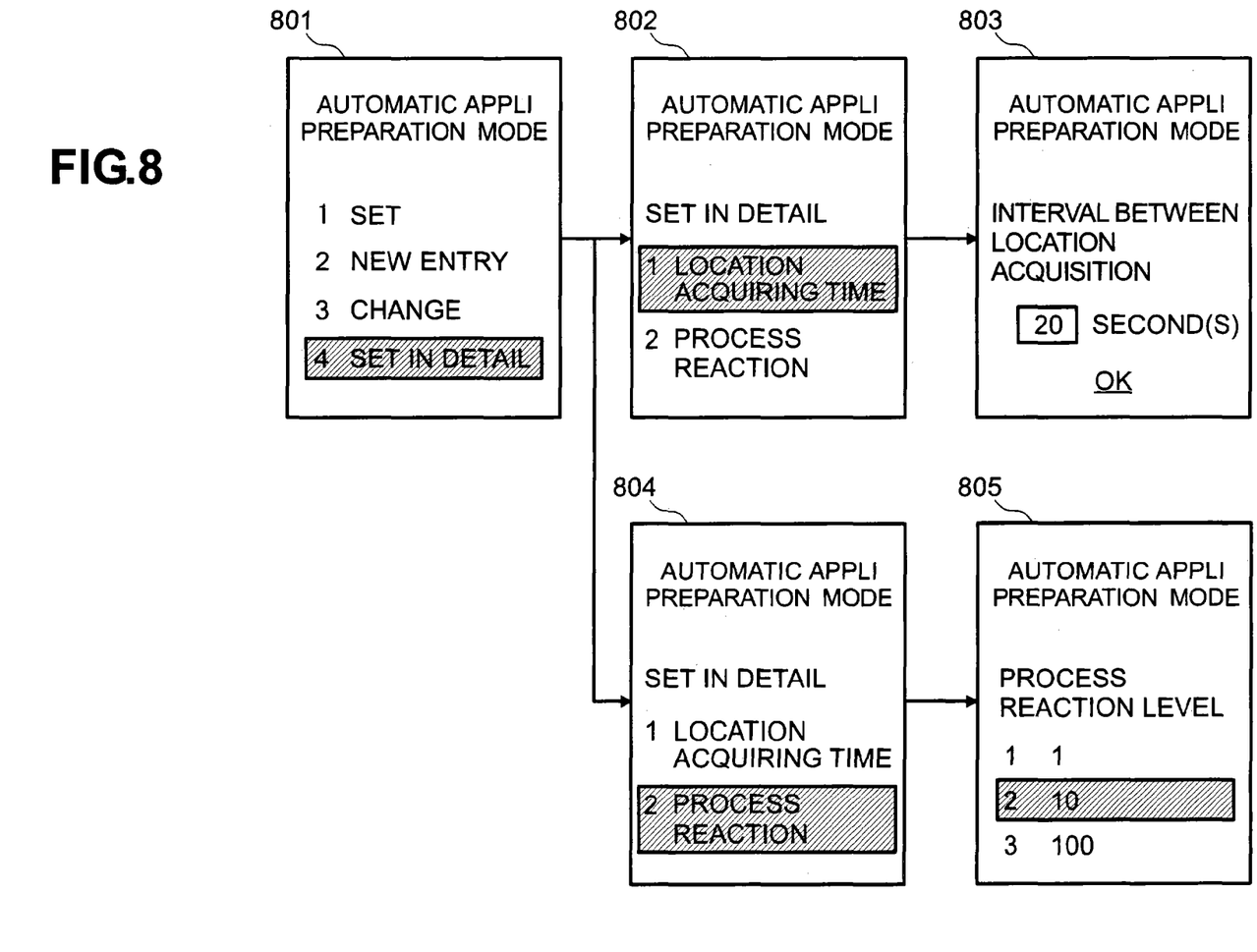
FIG. 8 illustrates transition examples of menu displays on the mobile phone of an embodiment of the invention for setting functions of the second and third examples of operational procedures.

FIG. 8 shows each example of the displays of the mobile phone of the embodiment when changing max_num in the second example of the previously described operational procedure and max_time in the third example of the previously described operational procedure.

When "set in detail" is selected on a display 801, a display 802 is shown. Further, when "interval between location acquisition" is selected, a display 803 is shown. On the display 803, "interval between location acquisition" can be entered, and this number is used for the interval between acquisition of location information. This number is checked and the previously described max_time is determined.

For example, let us consider the case where the process from step S701 to step S704 in FIG. 7 is executed "n" times a second. If the number entered on the display 803 is "N_input," and "N_input"×n is used for "max_time," the interval between acquisition of location information is "N_input" seconds.

When "process reaction" in "set in detail" is selected (display 804), a display 805 is shown. The previously described max_num is determined by using the value of the process reaction level. The greater max_num is, the more the frequency of decompressing the application program is reduced. In this case, the process reaction level is considered to be low. Since the process reaction level is inversely proportional to max_num, a reciprocal of the value of the process reaction level must be used to determine max_num.

Further, when the second and third examples of the operational procedure are used at the same time, the frequency of the decompression per unit of time varies depending on the value of "interval between acquisition of location."

For example, the value of the process reaction level, "interval between acquisition of location" and max_num are set to "N_level," "t" second, and "1,000/N_level," respectively. In this case, when the location ranges acquired successively for "1,000/N_level×t" seconds are registered on the correspondence table 106, or when location ranges successively acquired are not registered on the correspondence table 106, application programs are decompressed or deleted. Assuming that an "interval between acquisition of location" is 1 (one) second and process reaction level "N_level" is 10 (ten), an application program is decompressed when the user continues to stay in the registered location range for 100 seconds.

In the above embodiments, application to a mobile phone has been described as an example. However, it is needless to say that the present invention is applicable to mobile terminals such as PDAs.

Also, application programs are used as objects to be automatically decompressed in the above embodiments. However, the application programs referred to in the present invention include interface software for connection to the mobile terminal and middleware-like software for mediating independent application software.

Further, in the above embodiments, when decompressing application programs, compressed application programs preserved in the application compressing part 103 are maintained as they are. However, it is possible to delete the original compressed application program from the application compressing part 103 when compressing the application program and storing it in the compressed-application storing part 108, and compressing again the decompressed application program by using the application compressing part 103 and preserving it in the compressed-application preserving part 107 when deleting the application program from the compressed-application storing part 108. When processing in this way, it is desirable for the application compressing part 103 and the application decompressing part 104 to use reversible data-compression methods such as an LZ77 format. Accordingly, the data is not affected every time the application program is decompressed or compressed.

In the description of the above embodiment, the case where there are two or more application programs to be decompressed corresponding to the acquired location information was not referred to. However, when there are two or more programs to be decompressed, an application program with priority is automatically decompressed. In this regard, the priority may be assigned by the user, or a program which has been most frequently decompressed may take precedence over others.

Further, according to the description of the above embodiment, the location range registered on the correspondence table 106 was a rectangular region. However, the location range is not limited to a rectangle and it may take any configuration.

As described above, in the mobile terminal according to the present invention, memory consumption can be saved by compressing and preserving the application programs which are not used. Further, when using an application program, a user can smoothly use it without feeling uneasy with the waiting time.

The foregoing invention has been described in terms of preferred embodiments. However, those skilled, in the art will recognize that many variations of such embodiments exist. Such variations are intended to be within the scope of the present invention and the appended claims.

What is claimed is:

1. A mobile terminal comprising:
   a compressed-application memory configured to compress and store an application program;
   a location-information acquirer configured to acquire location information of a location of the mobile terminal;
   a determination unit configured to determine whether or not the application program stored in the compressed-application memory should be decompressed based on the location of the mobile terminal; and
   a decompressor configured to decompress the application program when the determination unit has determined that the application program should be decompressed.

2. A mobile terminal according to claim 1 further comprising a correspondence table storing the correspondence between an identifier of said application program and data of a location range.

3. A mobile terminal according to claim 2 further comprising:
   a decompressed-application memory configured to store the decompressed application program; and
   a determination device configured to determine, according to a state of use of the decompressed application program, whether or not the decompressed application program should be deleted from said decompressed-application memory when the location of the mobile terminal is out of the location range corresponding to the decompressed application program on said correspondence table.

4. A mobile terminal according to claim 2, wherein said decompressor decompresses the application program corresponding to the location range when the location information of the mobile terminal acquired by said location-information acquiring means is found a prescribed number of times in succession in said location range stored on said correspondence table.

5. A mobile terminal according to claim 2, wherein the correspondence table stores an identifier of said application program, data of said location range, and data of time of the day and/or of day of the week of use, and the application program corresponding to a particular location range is decompressed when the location information of the mobile terminal is in the particular location range in said correspondence table and the time and/or the day of the week on that occasion corresponds to the time of the day and/or the day of the week of use corresponding to said particular location range.

6. A mobile terminal according to claim 1, wherein said location-information acquirer is configured to change or set an interval between acquisitions of location of the mobile terminal.

7. A mobile terminal according to claim 1 further comprising a usage history table establishing the correspondence at least between an identifier of the application program and the location information of the mobile terminal when a user decompresses and uses the application program.

8. A mobile terminal according to claim 7, wherein said usage history table stores an identifier of said application program, said location information, and time at which the user decompressed and used the application program and/or day of the week on which the user decompressed and used the application program.

9. A mobile terminal according to claim 7 further comprising determination device configured to determine whether or not at least the identifier of the application program and the data of the location information are automatically registered on said correspondence table by referring to contents of said usage history table when the user decompresses and uses the application program.

10. A method for controlling a mobile terminal comprising a location acquirer to acquire a location of the mobile terminal, wherein a compressed application program corresponding to a pre-registered particular location range is decompressed when the acquired location of the mobile terminal is found a prescribed number of times in succession in the pre-registered particular location range.

11. A method for controlling a mobile terminal according to claim 10, wherein a user is notified by an audio, visual or vibrating indication when the compressed application program is decompressed.

* * * * *